United States Patent Office 3,288,730
Patented Nov. 29, 1966

3,288,730
POLYADDITION PRODUCTS OF POLYBASIC ARALIPHATIC CARBOXYLIC ACIDS
Josef Baltes, Hamburg, and Friedrich Weghorst and Zdzislaw Makus, Hamburg-Harburg, Germany, assignors to Harburger Fettchemie Brinckman & Mergell G.m.b.H., Hamburg-Harburg, Germany, a corporation of Germany
No Drawing. Filed Apr. 25, 1963, Ser. No. 275,524
Claims priority, application Germany, Nov. 3, 1962, H 47,313
4 Claims. (Cl. 260—2.5)

The invention relates to a process for the manufacture of polyaddition products which may be foamed from organic polyisocyanates and polyesters, containing hydroxy and/or carboxylic groups, of polybasic araliphatic carboxylic acids wherein according to the selection and proportions of the said reaction components and the conditions of the polyaddition, if desired with the aid of further additional materials, homogeneous or foamed elastic of hard masses are obtained.

It is known in the isocyanate-polyaddition process to produce polyaddition products from polyisocyanates and high-molecular compounds containing reactive hydrogen atoms, the properties of which polyaddition products can be varied within wide limits, dependent principally on the type and proportions of the initial materials as well as the conditions of the polyaddition. Polyesters having free hydroxy groups and/or carboxylic groups, derived from polyhydric alcohols and polybasic carboxylic acids, are preferred for this purpose. In obtaining the requisite polyesters it has been proposed to use in particular aliphatic dicarboxylic acids, such as adipic acid and its immediate homologues, as well as dimeric fatty acids obtained by dimerisation of the higher unsaturated fatty acids and aromatic dicarboxylic acids, for example, phthalic acid. It is also known to use with these the higher functional carboxylic acids, for example, trimeric and higher polymeric fatty acids, as well as monocarboxylic acids, for example, fatty acids with 14 to 18 carbon atoms. Attempts have also been made to use for this purpose hydroxy monocarboxylic acids as for example, recinoleic acid or castor oil as well as resin acids. In practice, however, at the present time there are used predominantly polyesters from adipic acid and to a lesser extent dimeric fatty acids.

In contrast to the known products there is provided in accordance with the present invention a process for the production of polyaddition products containing urethane groups and/or carbonamide groups which comprises reacting with a polyisocyanate a polyester formed by the condensation of a polybasic araliphatic carboxylic acid or its ester with a polyhydric alcohol, said polyester having a hydroxy number of 25 to 300 and an acid number of 0.1 to 100.

According to the purpose for which the polyaddition products are to be used, additional materials such as activators, cross-linking agents, propellants, stabilisers, solvents, fillers and pigments can be used as additives. The starting materials available for the production of polyurethane plastics are thus extensively broadened in accordance with the invention to include a particularly cheap new group of polyesters of polybasic araliphatic carboxylic acids.

The requisite polybasic araliphatic carboxylic acids for the production of the polyesters used in accordance with the invention are obtained by cationic copolymerisation of conjugated unsaturated fatty acids or their derivatives, as well as their mixtures with aromatic vinyl compounds, for example styrene and its homologues as described in applicants' United States Application No. 272,873 filed April 15, 1963, entitled, Process for the Manufacture of Polybasic Araliphatic Carboxylic Acids and Derivatives Thereof, the entire content of which is herein incorporated by reference. As pointed out in said copending application Serial No. 272,873, there are prepared polybasic araliphatic carboxylic compounds by subjecting the conjugated unsaturated fatty acid compound selected from the class of conjugated unsaturated fatty acids and $C_1$ to $C_4$ alkanol esters of the said acids to ionic copolymerization with an aromatic vinyl compound selected from the class consisting of styrene and homologs of styrene, more particularly, styrene, alpha-methyl styrene and vinyl toluene, in the proportion of 1 mole of fatty acid compound to 0.1 to 5 moles of aromatic vinyl compound and controlling the temperature of the reacting mass to prevent the mass temperature from exceeding at any time a temperature of about 200° C., subsequently removing volatile products of the reaction by distilling the mass at atmospheric pressure, and recovering the product. Preferably, 0.5 to 2 moles of styrene or its homologs per mole of conjugated unsaturated fatty acid compound are employed. Preferably, the reaction temperature is between 50 and 150° C.

Conjugated fatty acids of all kinds as well as their derivatives serve as initial materials for the production of the araliphatic polycarboxylic acids, derivatives of the said conjugated fatty acids preferably being their esters, for example, elaeostearic acid, licanic acid, dehydrated ricinoleic acid (ricinene fatty acid) isomerised linoleic acid, isomerised linolenic acid, isomerised polyethenoid fatty acids of marine animal oils, conjugated unsaturated resin acids (abietic acid laevopimaric acid) and mixtures with saturated and other unsaturated fatty acids. Particularly suitable are esters with monohydric alcohols having 1 to 4 carbon atoms, preferably the methyl esters, since in their case distillative removal of the nonpolymerised ester portion is particularly favorably effected. Other useful substances are all fats and oils in which the said fatty acids are combined, as for example wood oil, oiticica oil, dehydrated castor oil and isomerised oils such as soya oil, cotton seed oil, sunflower, safflower oil, corn oil, linseed oil, perilla oil and marine animal oils. When using these oils it is generally suitable before or after copolymerisation, to convert them by alcoholysis into the ester of a monohydric alcohol having 1 to 4 carbon atoms, preferably into the methyl ester, or to split them in order to obtain the free acid. The requisite araliphatic carboxylic acids are of an unsaturated nature and consist practically completely or in part of polybasic acids or their derivatives. Their general constructional principle depends on at least two molecules of conjugated fatty acid being combined with one molecule or several molecules of the aromatic vinyl compound. Their main carbon chain terminates with a carboxylic group whilst the aromatic group as well as alkyl or alkylene groups are arranged as side chains.

The polybasic araliphatic carboxylic acids or suitable derivatives thereof, preferably their esters with monohydric aliphatic alcohols, are condensed in an otherwise known way with polyhydric aliphatic alcohols or ether alcohols, so that polyesters are obtained which are mainly fluid at normal temperature.

Suitable alcohols for the production of such polyesters are for example glycols of the general formula,

wherein $n$ is an integer greater than 1, for example ethyleneglycol, propylenediol, butane diol; in addition polyethylene glycols of the general formula,

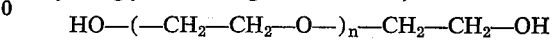

wherein $n$ is an integer greater than 0, for example, diethylene glycol, or triethylene glycol; also propylene glycols and polypropyleneglycols of the general formula

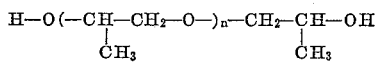

wherein $n$ is 0 or an integer; other suitable alcohols are glycerine, trimethylolpropane, trimethylolethane, hexanetriol-1,2,6, pentaerythritol, and addition products of alkylene oxides, for example ethylene oxide with the said dihydric and polyhydric alcohols.

The described polyesters are customarily produced from the araliphatic polycarboxylic acids or their mixtures with other carboxylic acids by esterification with the said polyhydric alcohols. They are obtained practically free from carboxylic groups in a particularly advantageous manner by starting with an ester of an araliphatic polycarboxylic acid; preferably from their methyl ester and subjecting this to alcoholysis with the said polyhydric alcohol.

The described polyesters are mostly liquid at normal temperature and have an average molecular weight of 800 to 6000, preferably 1500 to 4000. Their reactive hydrogen atoms can be present as hydroxy and/or carboxylic groups. Accordingly the polyesters to be used show a hydroxy number of 25 to about 300. Their acid numbers are customarily held within low limits, somewhat between 0.1 and 5. Such polyesters react with isocyanates predominantly with the formation of masses containing urethane groups. Higher acid numbers are however permissible when the polyaddition is sought with the preferred formation of carbonamide groups. In this case the acid number can be regulated up to a maximum of 100, preferably up to between 20 and 60. The sum of the hydroxy number and the acid number should thus lie within the range of 25 to 400. By suitable selection of the proportions and also the type of condensation process it is easily possible to produce polyesters with hydroxy groups or also with hydroxy and carboxy groups of the described type. The polyesters used in the invention and based on the polybasic araliphatic carboxylic acids can be modified with other polycarboxylic acids, for example adipic acid, and/or mono carboxylic acids, for example oleic acid.

The described polyester can be subjected to the polyaddition process with both simple polyisocyanates, which result from the phosgenation of appropriate polyamines, and with higher molecular compounds having a plurality of isocyanate groups. Suitable simple polyisocyanates are, for example, toluylene-2, 4-diisocyanate, toluylene-2-6- diisocyanate, p- and m-phenylenediisocyanate, diphenylmethane-4.4'-diisocyanate, naphthylene-1, 5-diisocyanate, hexamethylene diisocyanate. Higher functional polyisocyanates such as 4.4'.4". triphenylmethane-triisocyanate can also be used. Likewise higher molecular polyisocyanates can be used which are obtained by reaction of simple polyisocyanates with trimethylolpropane or like triols. It may also be advantageous to use prepolymerisate with free isocyanate groups which is obtained by reaction of the described polyesters with excess diisocyanate at elevated temperatures. In order to delay the polyaddition, which is desirable for example with a lacquer composition on an isocyanate basis, the so-called "masked" polyisocyanates can be used, which are obtainable by reaction of the above-mentioned diisocyanates with monohydroxy compounds, for example aliphatic and cycloaliphatic alcohols and phenols, at elevated temperature and in the presence of polymerisation catalysts.

The use in accordance with the invention of the new type of polyesters from polybasic araliphatic carboxylic acids brings, in contrast to the polyesters hitherto used, within the framework of the isocyanate polyaddition process very considerable and in part surprising advantages. These advantages relate both to their wide possibility of substitution in the isocyanate polyaddition process and also to their specially favorable workability and not least to the outstanding properties of the artificial materials developed from this new type of polyester.

Polyester urethanes can, as known, be produced and used in various forms for example, as homogenous elastomers, as elastic, semi-rigid and rigid foamed materials and as lacquers, film-forming products, coating and impregnating compositions to mention but a few of the important fields. According to the type of working-up and the intended use structurally quite different types of polycarboxylic acid are drawn on for the production of the required polyester without succeeding in producing artificial materials with optimal properties adapted to all of the said proposed from one and same polycarboxylic acid type. In contrast, the polyesters of the invention based on the polybasic araliphatic carboxylic acids are used both for the production of homogenous elastomers and foamed artificial materials and for the production of lacquers, film-forming compositions, coating and impregnating compositions, wherein suitably appropriate modifications are used in relation to the use intended at the time. These modifications relate mainly to the selection of the requisite polyol for its production, to the regulation of the content of free hydroxy or carboxylic groups and to the modification with monocarboxylic acids and other polycarboxylic acids as well as the suitable selection of the generally known additives and assistants required for the particular working-up.

The working-up of the polyesters used in accordance with the invention is particularly advantageous, since they are liquid at normal temperature and very compatible with the requisite additives and assistants, and their viscosity can be readily regulated to the particular intended use and working-up conditions. Accordingly for the development of foamed material the commercially specially desirable single stage working is preferred, in which the polyisocyanate as the one component as well as the polyester together with all additives and assistants as the other component are mixed in the required proportions and then the foam-formation, if desired with shaping, is allowed to take place at normal or elevated temperature. Homogenous elastomers can be produced basically in the same manner, but also here the two stage process can be equally advantageous, in which in the first stage a preadduct is formed from a polyester with a low content of carboxylic groups (acid number under 5) and excess polyisocyanate, which is then transformed by further reaction with reactive components, such as polyols, into the desired macromolecular condition. In the manufacture of lacquers, film-forming compositions, coating and impregnating compositions, the polyesters preferred are those with higher hydroxy numbers (over 150) and very low acid numbers (preferably below 5). These polyesters are mixed in a known manner with suitable polyisocyanates. Such mixtures can be easily spread at normal temperatures and harden in a short time to a highly polished tenacious coating. The ability of such mixtures to adhere is naturally somewhat limited so that they must be worked-up as soon as possible. If on the other hand isocyanates masked with monohydroxy compounds are used then it is possible to produce mixtures which have practically unlimited durability at normal temperature and which harden at elevated temperature. By associated use of suitable solvents, for example, esters, ketones, phenols and chlorinated hydrocarbons, as well as catalysts which reduce the hardening temperature and time, for example alkyl and aryl amines and carboxylic acid amidoamines, and softeners, lacquer resins, fillers and pigments, such systems can be modified in wide limits and adapted to the particularly desired use.

The products in accordance with the invention have an unusual stability to hydrolytic influences, without their other properties, generally possessed by isocyanate based polyaddition products, being altered disadvantageously. Further noteworthy advantages arise from their technically simple method of manufacture, and insofar as concerns the use of the described polyesters, from the particularly cheap raw material.

The following examples will serve for further explanation of the invention.

*Example I*

Isomerised safflower oil fatty acids were copolymerised with a mixture of 2 parts by weight of styrene and 1 part by weight of alphamethyl styrene in the ratio of 1 mol of vinyl compound per mol of conjugated unsaturated fatty acid and after removal by distillation of the volatile components at 260° C. at 0.5 torr, a bright yellow copolymerisate was obtained with an acid number of 150 corresponding to an equivalent weight of 375.

From 1,900 grams of this copolymerised acid, 425 grams of diethylene glycol and 30 grams of pentaerythritol a polyester was produced by thermal condensation having a hydroxy number of 80, an acid number of 1, and a viscosity at 25° C. of 13,000 c.p.s.

200 parts by weight of this polyester were dried in a single stage heating at 110° C. in vacuum, then cooled to 65° C. and mixed with stirring with 50 parts by weight of toluylenediisocyanate (an isomeric mixture consisting of 2 parts by weight toluylene-2,4-diisocyanate and 1 part by weight toluylene-2,6-diisocyanate) in vacuum, whilst a temperature of 70° C. was maintained. After the mixture was completely freed from gas bubbles it was then at once poured into a mould and heated for three hours at 110 to 120° C. The obtained product was rubber-like, highly elastic and was very stable on long storage in moist atmospheres.

*Example II*

Isomerised soya oil fatty acid methyl ester and styrene in the proportion of 1 mol styrene to 1 mol conjugated unsaturated compound were the starting products for the copolymerisate for the production of the polyester. The volatile components were removed by distillation at 1 torr and a temperature up to 260° C. The product had a saponification number 145 and an acid number of 0.2.

1,380 grams of this polycarboxylic acid methylate (about 2 mols) was heated under reflux with 318 grams diethylene glycol (3 mols) in the presence of 1.5 grams of sodium ethylate for one hour the immediate commencement of methanolysis being discernible by the refluxing methanol. The methanol was then distilled off whilst the temperature of the reaction mixture generally was increased to 210° C. A total distillate of 160 ml. was obtained, which corresponded with the theoretically anticipated amount of methanol. Now, without cooling, 2 grams of 84% phosphoric acid for neutralisation and 282 grams of adipic acid (2 mols) and 212 grams of diethylene glycol (2 mols) was added and the mixture heated under reflux and the water set free then removed by distillation by heating up to 210° C. The total amount of water removed was 72 mls. which practically corresponded with the theoretically anticipated amount. Finally, the mixture was further heated for ½ hour at about 20 torr and small amounts of diethylene glycol distilled off. The polyester obtained was at room temperature, of a liquid honey-like character and possessed a hydroxy number of 53 and an acid number of 2.

50 parts by weight of this polyester were then stirred into 20 parts by weight of diphenylmethane-4,4′-diisocyanate and heated rapidly under vacuum to 135° C. and held for 12 minutes with occasional stirring at this temperature. 4.5 parts by weight of 1.4-butylene glycol were then mixed in with vigorous stirring, the temperature of the mixture falling back to 125° C. After a total stirring time of half a minute the vacuum was lifted and the viscous mass formed cast into a heatable mould. At a temperature of 120 to 140° C. it hardened within about two hours and could then be easily removed from the mould.

The rubber-like product obtained was highly elastic, extraordinarily shear-resistant and was as highly resistant after several weeks storage in a steam saturated atmosphere at 50° C. as after several hours treatment with boiling water.

*Example III*

Isomerised soya oil fatty acids were used as a starting material for the production of the polyesters, the fatty acids being copolymerised with styrene in the proportion of 1.2 mols of styrene per mol of conjugated unsaturated acid. The volatile components were removed in vacuum at about 1 torr and 260° C., the copolymerisate remaining in a yield of about 65%. Its acid number was 142.

350 parts by weight of this polycarboxylic acid and 106 parts by weight of diethylene glycol (molecular ratio about 1:2) together with 0.5 parts by weight of toluene sulphonic acid were heated for about 1 hour under reflux. The water set free was then distilled off with a general increase in temperature up to about 210° C. Towards the end the esterification was effected under a vacuum of about 5 torr, whereby excess diethyleneglycol was distilled off in a quantity amounting in total to 24 parts by weight. The polyester obtained had a hydroxy number of 101, an acid number of 3, and a viscosity at 20° C. of 14,000 c.p.s.

For foam production a mixture of this polyester with various additives of the following composition was used:

| | Parts by weight |
|---|---|
| Polyester | 77.3 |
| Chalk | 18 |
| Water | 2.5 |
| Alkylphenolpolyglycolether | 1.1 |

2 parts of this mixture were then intimately mixed with 1 part of diphenylmethane-4-4′ diisocyanate, and after about 2 minutes a flexible foam formed, which could be removed from the containing vessel after a further 5 minutes. After a storage time of about 6 hours at normal temperature the final structure of the foamed mass was attained, which then had a specific weight of 0.08 gram per cu. cm. The foamed mass was extraordinarily stable after storage of several weeks at an atmosphere saturated with steam at 40° C.

For the production of other polyesters according with the invention such polybasic araliphatic carboxylic acids were also used which were produced by copolymerisation of dehydrated castor oil fatty acids, wood oil fatty acids, isomerised sunflower fatty acids and isomerised tall fatty acids and styrene, alpha-methyl styrene and mixtures of these vinyl compounds in the ratio of 0.5 to 2.5 mols of vinyl compound per mol of conjugated unsaturated acid. They had hydroxy numbers in the range of 50 to 110 and gave, on reaction with diphenylmethane-4.4′-diisocyanate, toluylene diisocyanate and naphthylene diisocyanate, with appropriate additives, as indicated above, extremely flexible foams, stable to damp, with a specific weight of 0.05 to 0.1 gram per cu. cm.

*Example IV*

For the production of polyesters starting materials were used comprising isomerised safflower oil fatty acids methyl ester and styrene in a ratio of 1 mol of styrene per mol of conjugated unsaturated compound, these being copolymerized, from which copolymerisate the volatile components were freed as described in the preceding examples. This copolymerisate had a saponification number of 146 and an acid number of 0.1.

3,600 grams of this polycarboxylic acid methyl ester and 954 grams of diethyleneglycol (molecular ratio about 5:9) were heated with 4.5 grams of sodium ethylate for 1 hour under reflux, the immediate commencement of methanolysis being recognizable by the refluxing methanol. At this stage the methanol was distilled off and the temperature of the reaction mixture increased generally to about 220° C. Within a total reaction time of about 4 hours, 390 ml. of methanol was obtained as distillate, whilst a theoretical 400 ml. was to be anticipated. The reaction mixture was now cooled to 100° C. and by stirring in 75% phosphoric acid exactly neutralized. Then 1,460 grams (about 10 mols) adipic acid together with 530 grams diethyleneglycol (5 mols) and 6 grams of toluene sulphonic acid were added to the mixture, heating being renewed for 1 hour with reflux condenser, and the temperature then increased generally to 220° C. with distilling off of the water set free. A total of 200 ml. of distillate was obtained which still contained small quantities of mehanol and diethyleneglycol. Finally, the excess diethyleneglycol was distilled off in vacuum until the resulting polyester had a hydroxy number of about 50 (47–53) and an acid number below 2.

For the manufacture of a foamed artificial material a mixture of this polyester with further additional materials of the following composition was then prepared:

| | Parts by weight |
|---|---|
| Polyester | 25 |
| Chalk | 5 |
| Alkylphenolpolyglycolether | 0.4 |
| Triethylamine | 0.4 |
| Triethanolamine | 1.4 |
| Water | 10 |

This mixture was then intimately stirred at normal temperature in the ratio of 2:1 with diphenylmethane-4.4'-diisocyanate. Within about half a minute a foamed material formed which could be removed after a further few minutes from the mixing vessel. It had a specific weight of 0.02 gram per cu. cm. was elastic and showed practically no alternation after several weeks storage in a damp atmosphere at 40 to 50° C.

*Example V*

From 720 parts by weight of the polycarboxylic acid methyl ester described in Example IV, 106 parts by weight of diethyleneglycol and 211 parts by weight of trimethanolpropane there was produced on alcoholysis with removal by distillation of the methanol set free, but without removal of the excess polyol, a polyester which had a hydroxy number of 260, an acid number of 1 and a viscosity of 40,000 c.p.s. at 25° C.

95 parts by weight of this polyester
2.5 parts by weight of water
1 part by weight of alkylphenolpolyglycolether
1.5 parts by weight of triethylamine were intimately mixed and then stirred with 90 parts by weight of diphenylmethane-4.4'-diisocyanate to a homogeneous mass. This immediately began to foam, and after a few minutes had formed a rigid foam, resistant to pressure, which had a specific weight of 0.08 gram per cu. cm. and was very stable after long storage in a damp atmosphere.

*Example VI*

100 parts by weight of a polyester, produced from 700 parts by weight of the polycarboxylic acid described in Example 1, 106 parts by weight of diethyleneglycol and 130 parts by weight of trimethylolypropane, having an acid number of 35 and a hydroxy number of 258 was intimately mixed with 2 parts by weight of lecithin, 5 parts by weight of a 20% solution of potassium methylate in methanol, 2 parts by weight of triethylamine and a solution of 6 parts by weight of trichlorfluormethane in 115 parts by weight of diphenylmethane-4.4'-isocyanate. The mixture began immediately to foam and was converted after a few minutes into a semi-rigid, finely porous foam, which was very stable after long storage in a damp atmosphere.

*Example VII*

From 690 parts by weight of polycarboxylic acid methyl ester described in Example II, 106 parts by weight of diethyleneglycol and 134 parts by weight of trimethylopropane was produced by alcoholysis, in the presence of 0.3 part by weight of potassium methylate, a polyester with the hydroxy number of 226 and acid number of 0.8. A 50% solution of this polyester in methyl acetate/butyl acetate (1:1) was used for reaction with a higher polyisocyanate, by the reaction of toluylenediisocyanate with trimethylolpropane and with a content of 13.2% NCO— groups, in the form of a 75% solution in methyl acetate 200 parts by weight of the polyester solution were mixed with 125 parts by weight of the polyisocyanate solution to give a lacquer. This lacquer spread on various supports was spray-dried after evaporation of the solvent and had formed after about 24 hours a tenaciously-hard, elastic coating. The clear lacquer began to gel after a few days, when its viscosity had continuously increased.

*Example VIII*

From 670 parts by weight of a copolymerisate obtained by copolymerisation of isomerized soya oil fatty acids methyl ester and styrene in the proportion of 1 mol of styrene per mol of conjugated unsaturated compound, without removal of the volatile components, and having a saponification number of 161, 42 parts by weight of ethyleneglycol and 134 parts by weight of trimethylolpropane there was produced by alcoholysis in the presence of 0.3 part by weight of potassium methylate, a polyester with the hydroxy number of 210 and the acid number of 0.6. 100 parts by weight of this polyester were dissolved in 200 parts by weight of a solvent mixture, consisting of methylglycolacetate, butanol, and methyl acetate in the ratio 2:1:1 and mixed with stirring and heating with 120 parts by weight of a 30% solution of a masked isocyanate, which had been obtained from 3 mols of toluylene diisocyanate and 3 mols of butanol by heating with the addition of small amounts of triethylamine. The lacquer obtained gave after heating above 180° C. a hard, tenaciously-elastic film.

We claim:

1. Process for the production of polyaddition products which comprises reacting an organic polyisocyanate with a polyester resulting from the alcoholysis of a polyhydric alcohol with a polybasic araliphatic carboxylic compound, said compound having been prepared by subjecting a conjugated unsaturated fatty acid compound selected from the class consisting of conjugated unsaturated fatty acids and $C_1$ to $C_4$ alkanol esters of said acids to ionic copolymerization with an aromatic vinyl compound selected from the class consisting of styrene, alpha-methyl styrene and vinyl toluene in the proportion of 1 mole of fatty acid compound to 0.1 to 5 moles of aromatic vinyl compound and controlling the temperature of the reacting mass to prevent the mass temperature from exceeding at any time a temperature of about 200° C., the said polyester being one in which the sum of the acid number and the hydroxyl number lies in the range of 25 to 400.

2. Process for the production of polyaddition products according to claim 1, wherein the reacting proportions of polyester to the organic isocyanate lie between 4:1 and 1:1.15, and wherein the temperatures during the reaction are maintained within the range of atmospheric temperatures to 140° C.

3. Process according to claim 1 characterized in that the organic polyisocyanate employed is a masked polyisocyanate in which the masking moiety is an aliphatic alcohol.

4. Process according to claim 1 in which a foam type polyaddition product is produced by conducting the reaction in the presence of a minor proportion of a tertiary amine and water.

(References on following page)

References Cited by the Examiner

UNITED STATES PATENTS

| | | | |
|---|---|---|---|
| 2,589,655 | 3/1952 | Armitage et al. | 260—22 |
| 2,655,488 | 10/1953 | Kanning et al. | 260—23 |
| 2,952,648 | 9/1960 | Swann et al. | 260—23 |
| 2,998,399 | 8/1961 | Petropoulos | 260—75 |
| 2,999,823 | 9/1961 | Dombrow | 260—2.5 |
| 3,108,084 | 10/1963 | Whitehill et al. | 260—22 |

FOREIGN PATENTS 162,598  10/1952  Australia.

OTHER REFERENCES

Noller, "Chemistry of Organic Compounds" (1952), page 541.

Bhow et al., "Industrial and Engineering Chemistry," vol. 42, No. 4, pp. 700–703.

Power, "Industrial and Engineering Chemistry," vol. 42, No. 10, pp. 2096–2099.

LEON J. BERCOVITZ, *Primary Examiner.*

DONALD E. CZAJA, J. J. KLOCKO,
*Assistant Examiners.*